(12) United States Patent
Seo

(10) Patent No.: US 10,090,120 B2
(45) Date of Patent: Oct. 2, 2018

(54) DOOR LOCKING DEVICE OF DISTRIBUTION BOARD OF AIR CIRCUIT BREAKER

(71) Applicant: LSIS CO., LTD., Anyang-si, Gyeonggi-do (KR)

(72) Inventor: Jaekwan Seo, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/638,236

(22) Filed: Jun. 29, 2017

(65) Prior Publication Data

US 2018/0122593 A1    May 3, 2018

(30) Foreign Application Priority Data

Nov. 2, 2016 (KR) .......................... 10-2016-0145356

(51) Int. Cl.
*H01H 9/20* (2006.01)
*H01H 9/22* (2006.01)
(Continued)

(52) U.S. Cl.
CPC ........... *H01H 9/226* (2013.01); *E05C 19/003* (2013.01); *E05C 19/10* (2013.01); *H01H 9/22* (2013.01);
(Continued)

(58) Field of Classification Search
CPC .. H01H 9/22; H01H 3/30; H01H 3/20; H01H 9/20; H01H 33/6661; H01H 21/06;
(Continued)

(56) References Cited

U.S. PATENT DOCUMENTS 7,019,229 B1    3/2006    Weister et al.
9,460,881 B1 *  10/2016   Morris .................. H01R 13/73
(Continued)

FOREIGN PATENT DOCUMENTS

EP    2110829       10/2009
EP    2110906 A2    10/2009
(Continued)

OTHER PUBLICATIONS

European Search Report for related European Application No. 17170813.4; report dated Dec. 15, 2017; (5 pages).
(Continued)

*Primary Examiner* — Ahmed Saeed
(74) *Attorney, Agent, or Firm* — K&L Gates LLP

(57) ABSTRACT

A door locking device of a distribution board of an air circuit breaker, including a transmission shaft transmitting power for drawing in and out a circuit breaker body, a shaft link rotatably coupled to one end of the transmission shaft, a link rod having one end rotatably coupled to a portion of the shaft link, a cam plate rotatably coupled to the other end of the link rod and pushing or pulling the circuit breaker boy, and a constraint plate installed in a distribution board door, further includes a pressing part protruding from a portion of the link road, and a hook plate rotatably coupled to a side of the cradle and having one end in contact with the pressing part to receive rotational force and the other end restricting or releasing the constraint plate, wherein the hook plate releases the constraint plate in a disconnection position.

13 Claims, 11 Drawing Sheets

(51) Int. Cl.
*E05C 19/00* (2006.01)
*E05C 19/10* (2006.01)
*H01H 9/28* (2006.01)
*H02B 11/133* (2006.01)
*H02B 11/26* (2006.01)
*H02B 11/173* (2006.01)
*E05C 21/00* (2006.01)

(52) U.S. Cl.
CPC ........... *H01H 9/286* (2013.01); *H02B 11/133* (2013.01); *H02B 11/173* (2013.01); *H02B 11/26* (2013.01); *E05C 21/00* (2013.01)

(58) Field of Classification Search
CPC ...... H01H 33/48; H01H 33/52; E05C 19/003; E05C 19/10; E05C 21/00; H02B 11/26; H02B 11/173
USPC ......... 200/50.24, 50.21, 50.26, 50.01, 50.17, 200/50.12, 401, 50.13, 327, 50.02, 50.03, 200/50.23, 50.25
See application file for complete search history.

(56) References Cited

U.S. PATENT DOCUMENTS

| | | | |
|---|---|---|---|
| 2006/0049026 A1 | 3/2006 | Weister | |
| 2008/0190747 A1* | 8/2008 | Carson | H01H 9/22 200/50.1 |
| 2013/0223875 A1* | 8/2013 | Bin | H01H 3/161 399/107 |
| 2014/0321067 A1* | 10/2014 | Leeman | H01R 13/00 361/728 |
| 2015/0262767 A1 | 9/2015 | Benke et al. | |
| 2015/0380910 A1* | 12/2015 | Oneufer | H02B 1/46 361/622 |
| 2016/0163490 A1* | 6/2016 | Jang | H01H 9/22 200/335 |

FOREIGN PATENT DOCUMENTS

| | | |
|---|---|---|
| JP | 2003308764 | 10/2003 |
| JP | 2011083184 | 4/2011 |
| JP | 2012178969 | 9/2012 |
| KR | 100852436 | 8/2008 |
| KR | 101305103 | 9/2013 |
| KR | 101345173 | 12/2013 |
| KR | 2020140001706 | 3/2014 |

OTHER PUBLICATIONS

Korean Office Action for related Korean Application No. 10-2016-0145356; action dated Sep. 8, 2017 (6 pages).

Korean Intellectual Property Office Search report dated Sep. 13, 2016, 3 pages.

* cited by examiner

DOOR LOCKING DEVICE OF DISTRIBUTION BOARD OF AIR CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2016-0145356, filed on Nov. 2, 2016, the contents of which are all hereby incorporated by reference herein in its entirety.

BACKGROUND OF THE INVENTION

1. Field of the Invention

The present disclosure relates to a door locking device of a distribution board of an air circuit breaker, and particularly, to a door locking device of a distribution board of an air circuit breaker, allowing a door of the distribution board to be opened only in a disconnection state.

2. Background of the Invention

In general, a circuit breaker is an electric device for switching (or opening and closing a load or breaking a circuit when an accident such as a short-circuit occurs or in the case of earthing in transmission and transformation of electric power or in an electric circuit. Among circuit breakers, an air circuit breaker uses air as an arc-extinguishing medium and is largely used in a low voltage device.

An air circuit breaker may be classified as a fixed type air circuit breaker fixed to and used in a distribution board or any other locations and a withdrawable type air circuit breaker in which a circuit breaker body thereof is installed to be drawn in and out from a cradle. The withdrawable type air circuit breaker is advantageous for maintenance of the circuit breaker body so as to be frequently used.

According to relative positions between a circuit breaker body and a cradle, the withdrawable type air circuit breaker may enter three positions (states), that is, a disconnection position (state) in which the circuit breaker body is drawn out from the cradle and a control (power) terminal is completely separated, a test position (state) in which the circuit breaker body is drawn into the cradle by a predetermined distance and a control terminal is electrically connected so that a connection state of the circuit breaker may be checked, and a connection position (state) in which the circuit breaker body is completely drawn in the cradle and a main circuit terminal is connected so that a main circuit is conducted.

FIGS. 1 and 2 illustrate a door locking device of a circuit breaker according to a related art. The related art is a technique disclosed in the Korean Patent Registration No. 10-1345173 entitled "Device for connecting circuit breaker and distribution board door".

The related art provides a device for connecting a circuit breaker and a distribution board door, operating not to allow opening of the distribution board door for electrical safety when the circuit breaker received in a distribution board is in a closing position (or ON position or conduction position). The device includes a main shaft 1, a main shaft lever 2, a first interworking lever mechanism 110, a second interworking lever mechanism 120, power transmission units E, W1, W2, and W3, and a constraint plate 130.

The first interworking lever mechanism 110 is installed on an outer side of the circuit breaker CB and connected to the main shaft lever 2 so as to be rotatable cooperatively according to rotation of the main shaft lever 2. The first interworking lever mechanism includes a first board 7 and a first lever 3. The first lever 3 is rotatably supported by the first board 7 through a first rotational shaft 4 installed to penetrate through the first board 7 and transmits power based on rotation of the main shaft lever 2 to the power transmission units E, W1, W2, and W3. A connection recess portion 3a1 of the first lever 3 may be coupled to a connection protrusion portion 2a of the main shaft lever 2, and thus, the first lever 3 may make seesaw movement centered on a first rotational shaft 4 according to rotation of the main shaft lever 2. A support bolt 5 placed below the first lever 3 supports a lower surface of the first lever 3.

When an end head portion E ascends or descends together with a support cap 6 according to the seesaw movement of the first lever 3, a first wire end portion W2 and a second wire end portion W3 integrally connected to the end head portion E may be pulled or pushed.

The second interworking lever mechanism 120 may be installed on an inner wall surface of a distribution board enclosure 140 and connected to the first interworking lever mechanism 110 by a power transmission unit (wire), whereby the second interworking lever mechanism 120 may rotate to a locking position in which opening of the distribution board door 141 is not permitted and to a release position in which opening of the distribution board door 141 is permitted according to rotation of the main shaft 1 to a circuit opening position or to a circuit closing position. The second interworking lever mechanism 120 may include a second board 121 and a second lever 122.

The second lever 122 is rotatably coupled to a second rotational shaft 123 supported by the second board 121 and includes a hook portion 122a, a spring connection portion 122b, and a power transmission unit connection portion 122c.

A force generated by the first lever 3 and transmitted through the power transmission unit pushes or pulls the power transmission unit connection portion 122c to allow the hook portion 122a to be caught to or released from the constraint plate 130, thus restraining or releasing opening of the distribution board door 141.

However, as described above, the distribution board door locking device of the air circuit breaker according to the related art has a complicated structure, increasing production cost and maintenance cost, and since it includes a large number of connection elements, there is a high possibility of a defective operation.

SUMMARY OF THE INVENTION

Therefore, an aspect of the detailed description is to provide a door locking device of a distribution board of an air circuit breaker, allowing a door of a distribution board to be opened only in a disconnection state through a simple configuration.

To achieve these and other advantages and in accordance with the purpose of this specification, as embodied and broadly described herein, a door locking device of a distribution board of an air circuit breaker, including a transmission shaft installed within a cradle and transmitting power for drawing in and out a circuit breaker body; a shaft link rotatably coupled to one end of the transmission shaft; a link rod having one end rotatably coupled to a portion of the shaft link; a cam plate rotatably coupled to the other end of the link rod and pushing or pulling the circuit breaker boy; and a constraint plate installed in a distribution board door, further includes a pressing part protruding from a portion of the link road; and a hook plate rotatably coupled to a side of the cradle and having one end in contact with the pressing part to receive rotational force and the other end restricting or releasing the constraint plate, wherein the hook plate releases the constraint plate in a disconnection position.

An elastic member providing a rotational force based on elasticity to the hook plate may be installed in a portion of the cradle, and the elastic member may be configured as a compressive spring or a tensile spring.

A spring hole allowing the elastic member to be insertedly installed therein may be provided in the cradle.

Coupling holes allowing the cam plate and the shaft link to be coupled thereto, respectively, may be formed in an upper end and a lower end of the link rod.

A lower surface of the pressing part may be perpendicular to a length direction of the link rod.

A pressing part shaft may be provided at one end of the hook plate and come into contact with the pressing part.

An operation recess allowing the pressing part shaft to slidably come into contact therewith and having a predetermined length may be provided below the pressing part.

An arrest part arrested by the constraint plate may protrude from the other end of the hook plate.

A rotational shaft may protrude from a central portion of the hook plate, and a rotational shaft hole allowing the rotational shaft to be insertedly installed therein may be provided on a side of the cradle.

A pressing part shaft slit allowing the pressing part shaft to be slidably inserted and installed therein may be provided on a side of the cradle.

The pressing part shaft slit may correspond to a portion of a circumferential surface centered on the rotational shaft hole.

The pressing part shaft and the rotational shaft may be configured to have a three-stage structure including a first step axial part, a second step axial part, and a third step axial part positioned sequentially from the hook plate, and the third step axial part may have a diameter smaller than that of the first step axial part and the second terminal axial part may have a diameter smaller than that of the third step axial part.

Assembly holes having a diameter larger than the third step axial part and smaller than the first step axial part may be provided respectively on one sides of the rotational shaft hole and the pressing part shaft slit in a communicating manner.

In the door locking device of a distribution board of an air circuit breaker according to the embodiments of the present disclosure, since an operation of the constraint plate of the distribution board door is restrained or allowed by the hook plate interworking with the link mechanism of the cradle, opening of the distribution board door may be restrained or allowed through a simple configuration.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 3 and 4 are perspective views of an air circuit breaker to which a door locking device of a distribution board of an air circuit breaker according to an embodiment of the present disclosure is applied, wherein FIG. 3 illustrates a state in which a circuit breaker body is separated from a cradle and a side portion of the cradle is partially cut away such that the inside is shown and FIG. 4 illustrates a disconnection state in which the circuit breaker body is drawn in to the cradle.

DETAILED DESCRIPTION OF THE INVENTION

Hereinafter, exemplary embodiments of the present disclosure will be described in detail with reference to the accompanying drawings so that a person skilled in the art to which the present invention pertains to easily implement the invention, but the present invention is not limited thereto.

Figure 1:
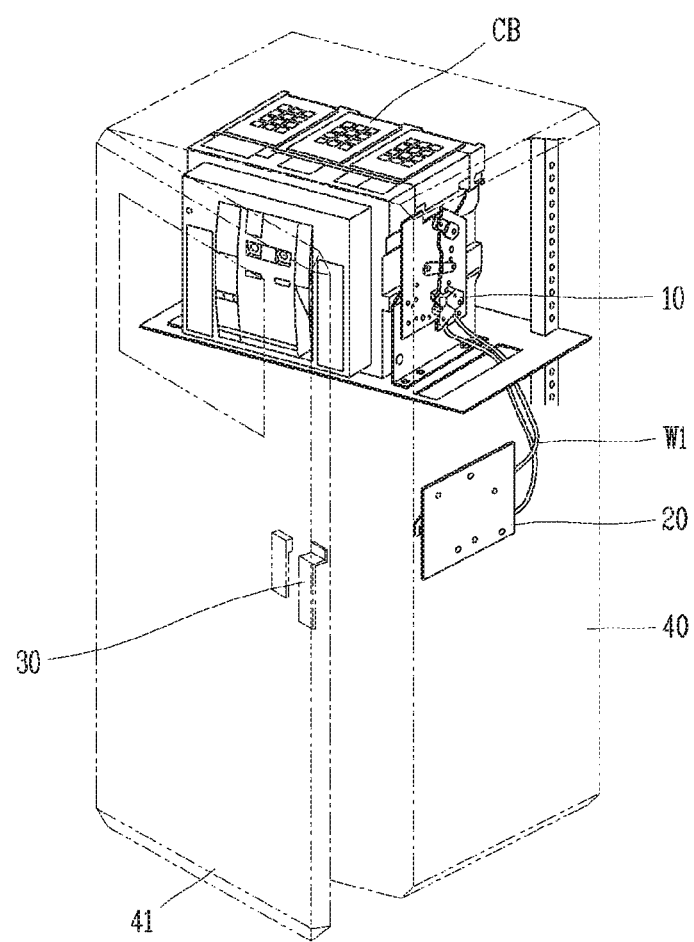
FIG. 1 is a perspective view of a door locking device of a distribution board of a circuit breaker according to the related art.
Figure 2:
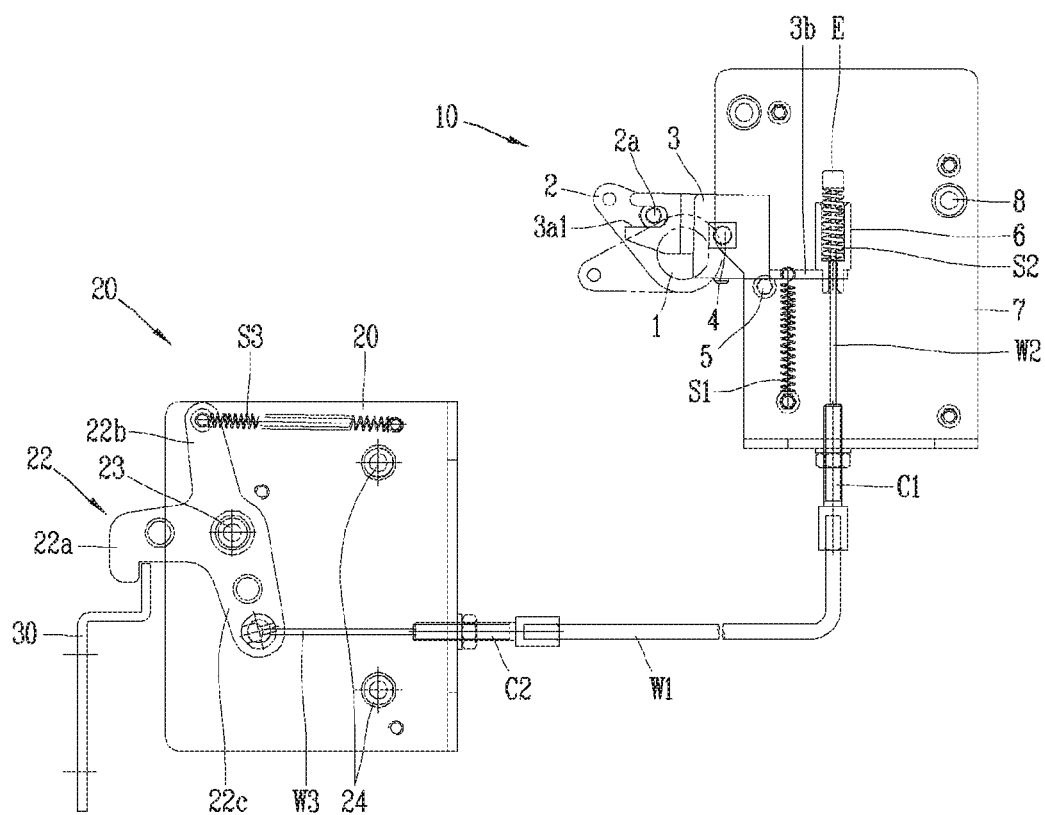
FIG. 2 is a plan view of a device for connecting a circuit breaker and a distribution board door according to the related art.
Figure 3:
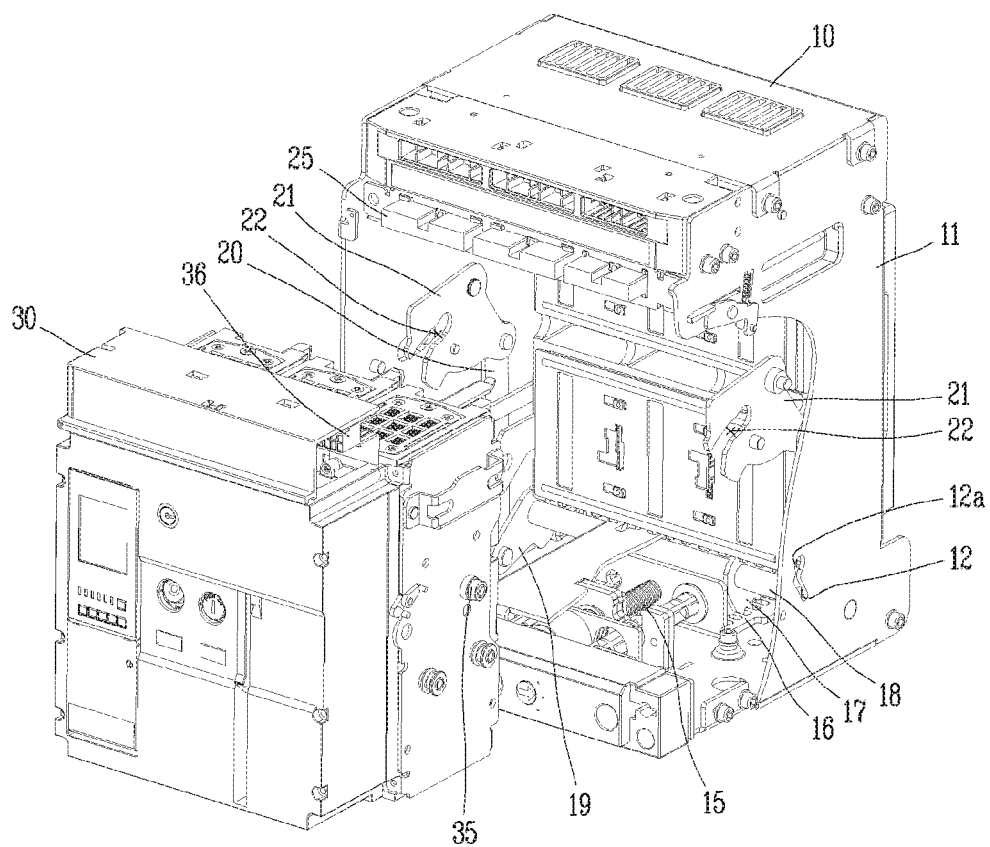
Figure 4:
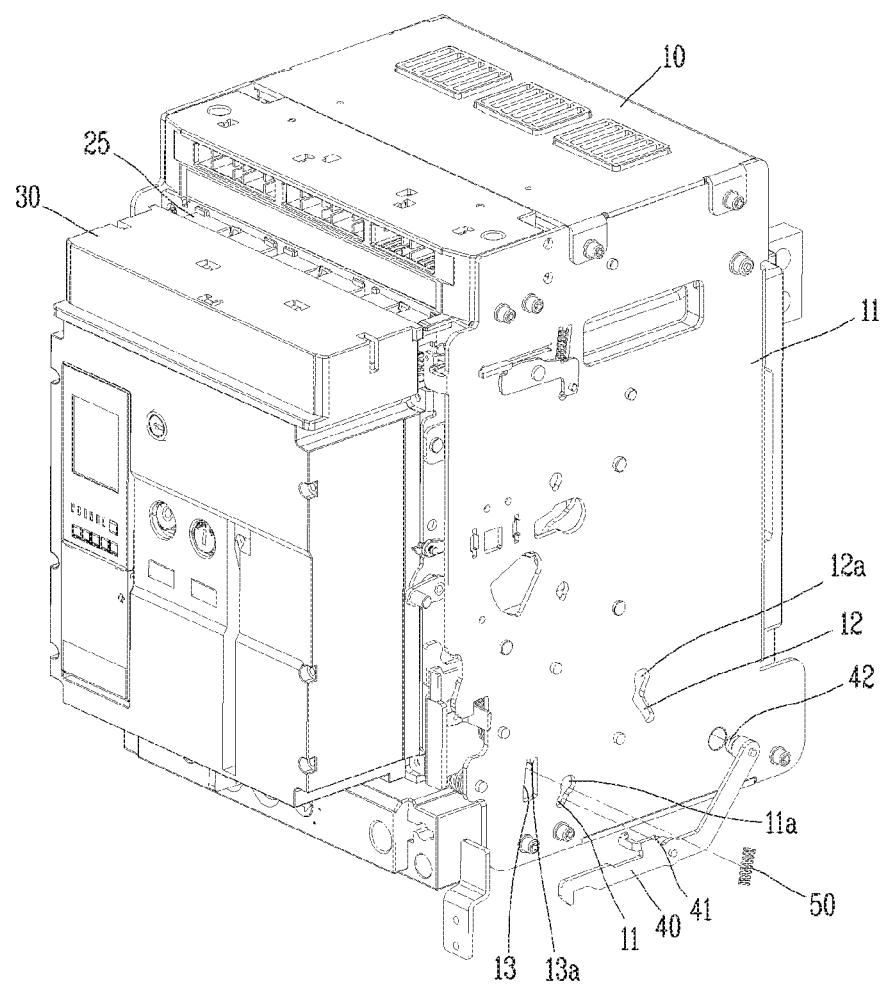
Figure 5:
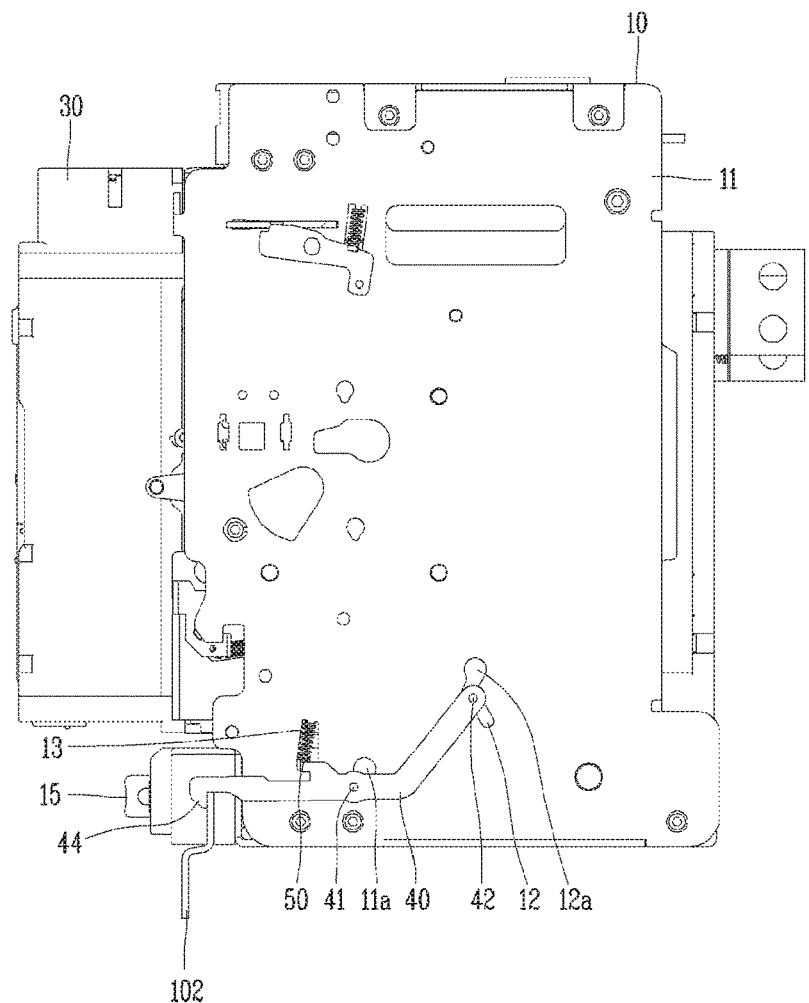
FIG. 5 is a side view of an air circuit breaker to which a door locking device of a distribution board of an air circuit breaker according to an embodiment of the present disclosure is applied.
Figure 6:
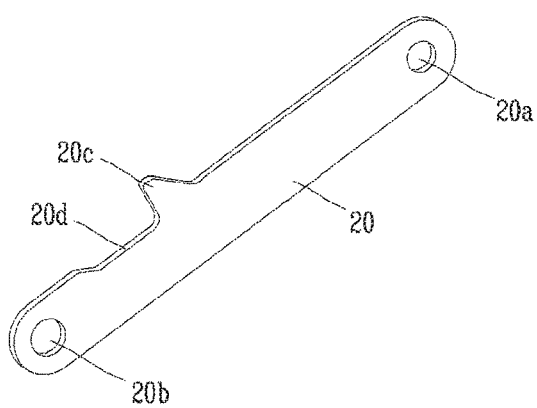
FIGS. 6 to 8 are perspective views of a link rod and a hook plate applied to a door locking device of a distribution board of an air circuit breaker according to an embodiment of the present disclosure is applied.
Figure 7:
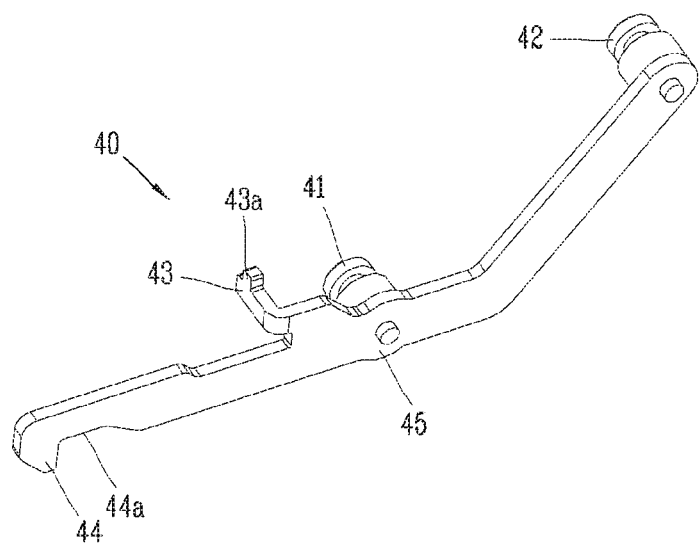
Figure 8:
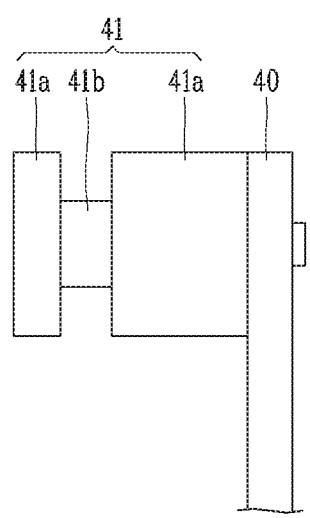

FIGS. 3 and 4 are perspective views of an air circuit breaker to which a door locking device of a distribution board of an air circuit breaker according to an embodiment of the present disclosure is applied. FIG. 5 is a side view of an air circuit breaker to which a door locking device of a distribution board of an air circuit breaker according to an embodiment of the present disclosure is applied. FIGS. 6 to 8 are perspective views of a link rod and a hook plate applied to a door locking device of a distribution board of an air circuit breaker according to an embodiment of the present disclosure is applied. A door locking device of a distribution board of an air circuit breaker according to embodiments of the present disclosure will be described with reference to the accompanying drawings.

A door locking device of a distribution board of an air circuit breaker according to an embodiment of the present disclosure, including a transmission shaft 18 installed within a cradle 10 and transmitting power for drawing in and out a circuit breaker body 30; a shaft link 19 rotatably coupled to one end of the transmission shaft 18; a link rod 20 having one end rotatably coupled to a portion of the shaft link 19; a cam plate 21 rotatably coupled to the other end of the link rod 20 and pushing or pulling the circuit breaker boy 30; and a constraint plate 102 installed in a distribution board door, further includes a pressing part 20c protruding from a portion of the link road 20; and a hook plate 40 rotatably coupled to a side 10a of the cradle 10 and having one end in contact with the pressing part 20c to receive rotational force and the other end restricting or releasing the constraint plate 102.

The cradle 10 may have a front side-opened box shape and accommodate the circuit breaker body 30. A rotational shaft hole 11 allowing a rotational shaft 41 of the hook plate 40 to be insertedly installed therein may be formed in a portion of one side 10a of the cradle 10. A first assembly hole 11a is formed on one side of the rotational shaft hole 11 in a communicating manner. A pressing part shaft slit 12 is spaced apart from the rotational shaft hole 11 and allows a pressing part shaft 42 of the hook plate 40 to be slidably inserted therein. The pressing part shaft slit 12 may have a shape of a circular arc corresponding to a portion of a circumferential surface centered on the rotational shaft hole 11. A second assembly hole 12a is formed on one side of the pressing part shaft slit 12 in a communicating manner. Here, the first assembly hole 11a of the rotational shaft hole 11 and the second assembly hole 12a of the pressing part shaft slit 12 may be formed to have the same size and shape. Also, the first assembly hole 11a of the rotational shaft hole 11 and the second assembly hole 12a of the pressing part shaft slit 12 may be installed in the same direction. That is, the first assembly hole 11a is formed on a north-east side of the rotational shaft hole 11, and the second assembly hole 12a may be formed on a north-east side of an upper end portion of the pressing part shaft slit 12. Accordingly, in order to assemble the hook plate 40 to the cradle 10, the rotational shaft 41 of the hook plate 40 is inserted into the first assembly hole 11a and a pressing part shaft 42 of the hook plate 40 is inserted into the second assembly hole 12a of the cradle 10, and in this state, the rotational shaft 41 and the pressing part shaft 42 may be pulled in a south-west direction so as to be inserted into the rotational shaft hole 11 and the pressing part shaft slit 12. Since the assembly holes 11a and 12a are present above the rotational shaft hole 11 or the pressing part shaft slit 12, the hook plate 40 may not be released and stably operated in a normal state.

A spring hole 13 allowing an elastic member 50 to be installed therein is formed in another portion of the side 10a of the cradle 10. The spring hole 13 may have a predetermined length. The spring hole 13 may be sloped at a predetermined angle in a vertical direction. A fixing protrusion 13a for fixing an upper end portion of the elastic member 50 may be formed in an upper end portion of the spring hole 13.

A control power module 25 is provided in an upper portion of a front surface of the cradle 10, and a control power connector 36 connected to the control power module 25 to form a control circuit is provided in the circuit breaker body 30.

A rail 14 is provided on an inner side of the cradle 10 and allows the circuit breaker body 30 to be mounted thereon and drawn into or out from the cradle 10. Meanwhile, a transfer device is provided in a lateral portion or a lower portion of the cradle 10 to drawn the circuit breaker body 30 mounted on the rail 14 in to or out from the cradle 10.

The transfer device may be installed below the cradle 10 in a forward/backward direction, and includes a screw shaft 15 receiving rotational force by a manual handle (not shown) or a gearing (not shown), a rack 16 installed to move in a forward/backward direction of the cradle 10 according to rotation of the screw shaft 15, a transmission shaft 18 rotated by a pinion 17 engaged with the rack 16, shaft links 19 installed at both ends of the transmission shaft 18, a link rod 20 rotatably coupled to one side of each of the shaft links 19, a camp plate 21 rotatably coupled to one side of the link rod 20, and cam followers 35 respectively installed on both sides of the circuit breaker body 30 and coupled to the cam slot 22 provided in the cam plate 21.

When the cam plate 21 rotates, the cam slot 22 of the camp plate 21 serves to push or pull the cam follower 35 inserted in the camp slot 22 to move the circuit breaker body 30 in a forward/backward direction, and here, the cam follower 35 may be configured as a roller to reduce frictional contact.

The link rod 20 may be configured as a linear plate. The link rod 20 has coupling holes 20a and 20b provided in upper and lower ends thereof to allow the camp plate 21 and the shaft link 19 to be coupled thereto. The pressing part 20c protrudes from a central portion of the link rod 20 to apply a force to the hook plate 40. A lower surface of the pressing part 20c may be formed as a surface perpendicular to a length direction of the link rod 20. Accordingly, a force applied to the hook plate 40 may be increased.

An operation recess 20d may be provided on a lower side of the pressing part 20c. The operation recess 20d may have a predetermined length and allow the pressing part shaft 42 of the hook plate 40 to come slidably into contact therewith.

The hook plate 40 is rotatably coupled to the side 10a of the cradle 10. One end of the hook plate 40 may be bent upwardly. Accordingly, the hook plate 40 may come into contact with the pressing part 20c placed at a position higher than the hook plate 40 and rotatability may be enhanced.

The pressing part shaft 42 is provided at one end of the hook plate 40. As the pressing part shaft 42 of the hook plate 40 comes into contact with the pressing part 20c of the link rod 20, the pressing part shaft receives a force, and accordingly, the hook plate 40 is rotated. A rotational shaft 41 is provided at a central portion 45 of the hook plate 40. The rotational shaft 41 may be configured to be the same as the pressing part shaft 42. That is, the rotational shaft 41 and the pressing part shaft 42 may be configured as a common product. Meanwhile, the central portion 45 of the hook plate 40 may have an area larger than those of other portions to secure sufficient bearing capacity for the rotational shaft 41 to be installed and moved.

The rotational shaft 41 may be configured as a three-stage structure. That is, the rotational shaft 41 may have a three-step structure including a first step axial part 41a, a second step axial part 41b, and a third step axial part 41c positioned sequentially from the hook plate 40. The first step axial part 41a, the second step axial part 41b, and the third step axial part 41c may have a disk shape. Here, the first step axial part 41a, the second step axial part 41b, and the third step axial part 41c have different diameters. The third step axial part 41c may have a diameter smaller than that of the first step axial part 41a, and the second step axial part 41b has diameter smaller than that of the third step axial part 41c. Meanwhile, a diameter of the first assembly hole 11a of the cradle 10 is larger than that of the third step axial part 41c and smaller than that of the first step axial part 41a. Accordingly, the rotational shaft 41 may be easily inserted into the first assembly hole 12a. The contents of the rotational shaft 41 and the first assembly hole 11a described so far may also be applied to the pressing part shaft 42 and the second assembly hole 12a.

Meanwhile, a diameter of the rotational shaft hole 11 and a width of the pressing part shaft slit 12 are smaller than the diameter of the third step axial part 41c and larger than the diameter of the second step axial part 41b. The second step axial part 41b is inserted into the pressing part shaft slit 12 so as to be operated. Accordingly, the rotational shaft 41 and the pressing part shaft 42 are not separated from the rotational shaft hole 11 and the pressing part shaft slit 12 in a normal state, respectively.

In the above, the first step axial part 41a, the second step axial part 41b, and the third step axial part 41c may be integrally formed.

A spring fixing part 43 is provided to be bent in an upper portion of one side of the central portion 42 of the hook plate 40. A fixing protrusion 43a may be provided in a portion of the spring fixing part 43, to which a lower end portion of the elastic member 50 may be fixedly installed. When the hook plate 40 is coupled to the cradle 10, the fixing protrusion 43a is inserted into a lower portion of the spring hole 13. Accordingly, the elastic member 50 may be installed between the fixing protrusion 13a of the spring hole 13 and the fixing protrusion 43a of the hook plate 40.

The elastic member 50 is installed between the fixing protrusion 13a of the spring hole 13 and the fixing protrusion 43a of the hook plate 40. The hook plate 40 receives rotational force based on elastic force by the elastic member 50. Here, the elastic member 50 may be configured as a compressive spring or a tensile spring. In this embodiment, when a compressive spring is installed in the spring hole 13, the hook plate 40 may be forced to rotate in a counterclockwise direction.

An arrest part 44 protrudes from the other end of the hook plate 40 and may be arrested by the constraint plate 102 of the distribution board door. The arrest part 44 may have a hook shape. In order to enhance the arresting operation, an arrest recess 44a may be provided to be adjacent to a rear side of the arrest part 44. An upper end portion of the constraint plate 102 may be in contact with the arrest recess 44a.

Figure 9:
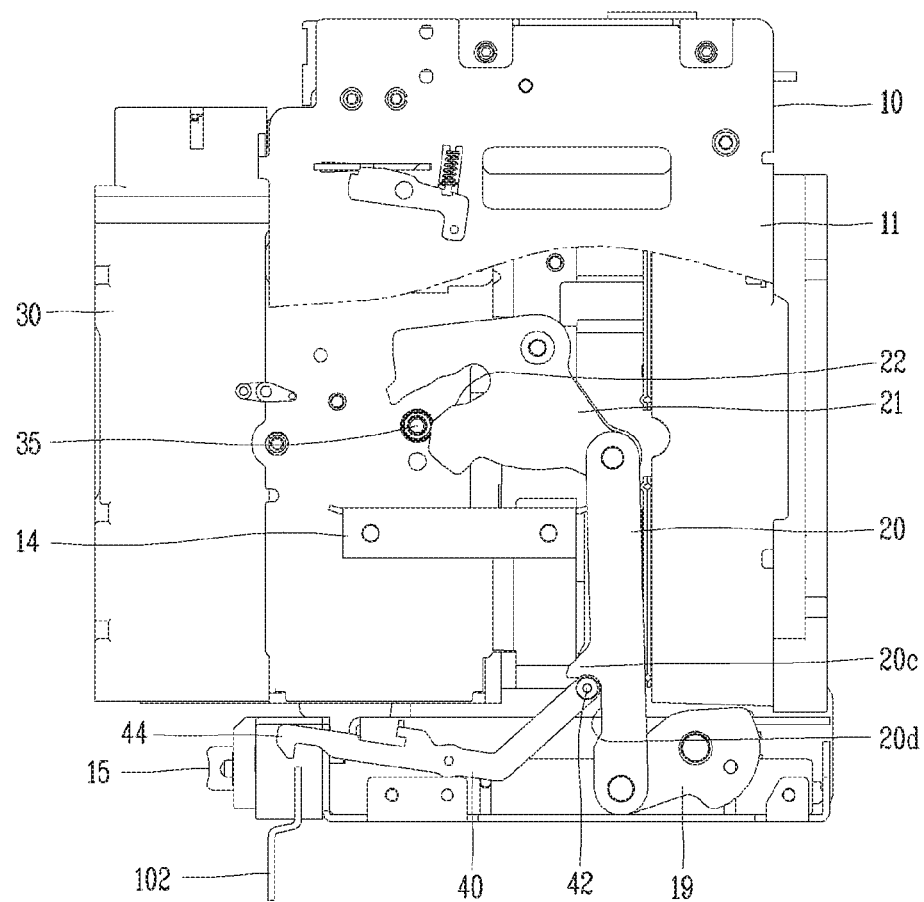
FIGS. 9 to 11 are views illustrating operations of an air circuit breaker according to an embodiment of the present disclosure, specifically, a disconnection state, a test state, and a connection state.
Figure 10:
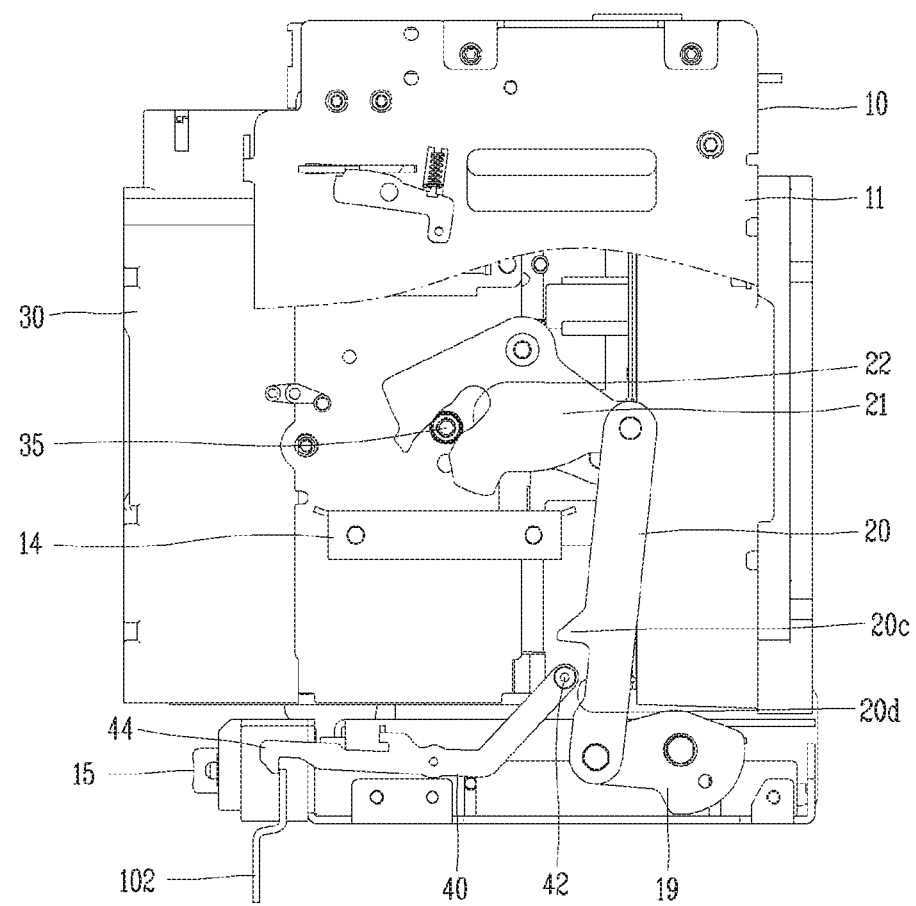
Figure 11:
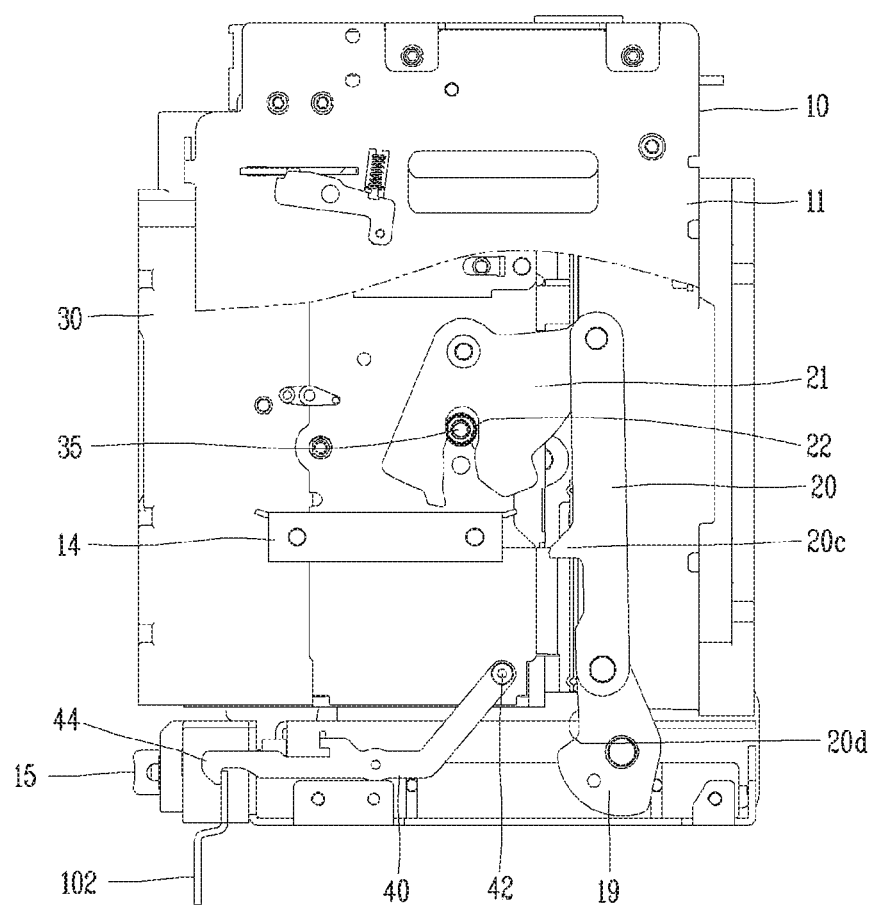

An operation of the door locking device of a distribution board of an air circuit breaker according to an embodiment of the present disclosure will be described with reference to FIGS. 5 and 9 to 11. FIGS. 9 to 11 are views illustrating a disconnection state, a test state, and a connection state.

First, a draw-in operation of the circuit breaker body 30 will be described. Referring to FIG. 9, the circuit breaker body 30 has been drawn in the cradle 10 and is placed in the disconnection position. The control power connector 36 of the circuit breaker body 30 is in a state of being separated from the control power module 25 of the cradle 10. The shaft link 19 has been rotated in a counterclockwise direction so the link rod 20 has been moved to be placed in a lower end. The cam plate 21 has been rotated in a clockwise direction so the camp follower 35 is in contact with an inlet of the cam slot 22.

The pressing part shaft 42 of the hook plate 40 presses the pressing part 20c so the hook plate 40 is rotated in a clockwise direction and the other end of the hook plate 40 is moved upwards. Accordingly, the arrest part 44 is released from the constraint plate 102 and the distribution board door is available to be opened.

Referring to FIG. 10, the circuit breaker body 30 is in the test position. When a user rotates the screw shaft 15 in a draw-in direction from the disconnection position, the shaft link 19 is rotated at a predetermined angle in a clockwise direction, and the link rod 20 connected thereto is moved by a predetermined distance upwards. The cam plate 21 connected to the link rod 20 is rotated in a counterclockwise direction, and the cam follower 35 is engaged with the cam slot 22 so as to be pulled inwards (backwards). Accordingly, the circuit breaker body 30 is moved by a predetermined distance to the test position. The control power connector 36 of the circuit breaker body 30 is connected to the control power module 25 of the cradle 10.

AS the pressing part 20c of the link rod 20 is separated from the pressing part shaft 42 of the hook plate 40, the hook plate 40 is rotated about the rotational shaft 41 by a force of the elastic member 50 in a counterclockwise direction and the arrest part 44 is arrested by the constraint plate 102. Accordingly, the hook plate 40 restrains opening of the distribution board door.

Referring to FIG. 11, the circuit breaker body 30 is in the connection position. When the user further rotates the screw shaft 15 in a draw-in direction from the test position, the shaft link 19 is further rotated at a predetermined angle in a clockwise direction, and the link rod 20 connected thereto is move in an uppermost direction. The cam plate 21 connected to the link rod 20 is further rotated in a counterclockwise direction, and the cam follower 35 is engaged with the cam slot 22 so as to be further pulled inwards (backwards). Accordingly, the circuit breaker body 30 is moved by a predetermined distance to the connection position. The control power connector 36 of the circuit breaker body 30 in a state of being connected to the control power module 25 moves backwards.

Since the hook plate 40 is maintained to be separated from the pressing part 20c, the arrest part 44 is arrested by the constraint plate 102 by elastic force of the elastic member 50. Thus, the hook plate 40 restrains opening of the distribution board door.

Hereinafter, a draw-out process of the circuit breaker body 30 will be described. With reference to FIG. 11, the circuit breaker body 30 is in a state of being drawn in the cradle 10 and placed in the connection position. The control power connector 36 of the circuit breaker body 30, in a state of being connected to the power control module 25 of the cradle 10, has moved backwards. The shaft link 19 is rotated in a clockwise direction and the link rod 20 is in a state of having been moved to an upper end. The cam plate 21 is rotated in a counterclockwise direction and the camp follower 35 is in a state of being deeply engaged with the camp slot 22.

The pressing part shaft 42 of the hook plate 40 is separated from the pressing part 20c of the link rod 20, so the hook plate 40 is rotated by the elastic member 50 in a clockwise direction and the arrest part 44 is arrested by the constraint plate 102. Accordingly, the hook plate 40 restrains opening of the distribution board door.

Referring to FIG. 10, the circuit breaker body 30 is in the test position. When the user rotates the screw shaft 15 in a draw-out direction from the connection position, the shaft link 19 rotates at a predetermined angle in a counterclockwise direction, and the link rod 20 connected thereto is move by a predetermined distance downwards. The cam plate 21 connected to the link rod 20 is rotated in a clockwise direction, and the cam follower 35 is engaged with the cam slot 22 and pushed forwards. Accordingly, the circuit breaker body 30 is moved by a predetermined distance to the test position. The control power connector 36 of the circuit breaker body 30, in a state of being connected to the control power module 25 of the cradle 10, is moved forwards.

The hook plate 40 is in proximity to the pressing part 20c, but not in contact with the pressing part 20c yet. Thus, the arrest part 44 is arrested by the constraint plate 102 to restrain opening of the distribution board door.

Referring to FIG. 9, the circuit breaker body 30 is in the disconnection position. When the user further rotates the screw shaft 15 in the draw-out direction from the test position, the shaft link 19 is further rotated at a predetermined angle in a counterclockwise direction and the link rod connected thereto is moved on a lowermost side. The cam plate 21 connected to the link rod 20 is further rotated in a clockwise direction and the cam follower 35 engaged with the cam slot 22 is further pushed forwards. Accordingly, the circuit breaker body 30 is moved by a predetermined distance to the disconnection position. The control power connector 36 of the circuit breaker body 30 is separated from the control power module 25 of the cradle 10.

The pressing part 20c of the link rod 20 comes into contact with the pressing part shaft 42 of the hook plate 40 to press the pressing part shaft 42. The hook plate 40 is rotated about the rotational shaft 41 in a clockwise direction so the arrest part 44 is released from the constraint plate 102. Accordingly, the hook plate 40 allows opening of the distribution board door.

Figure 12:
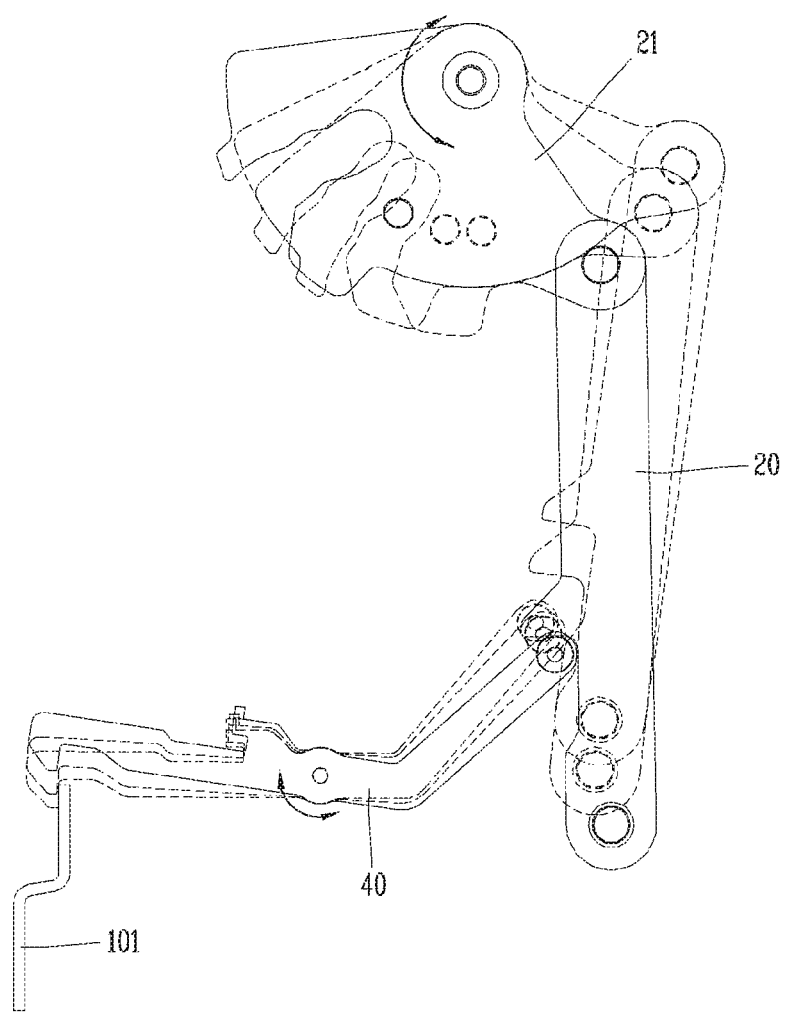
FIG. 12 is a view illustrating major portions of FIGS. 9 to 11 which overlap each other.

FIG. 12 illustrates an operation of the door locking device of a distribution board of an air circuit breaker described above.

Figure 13:
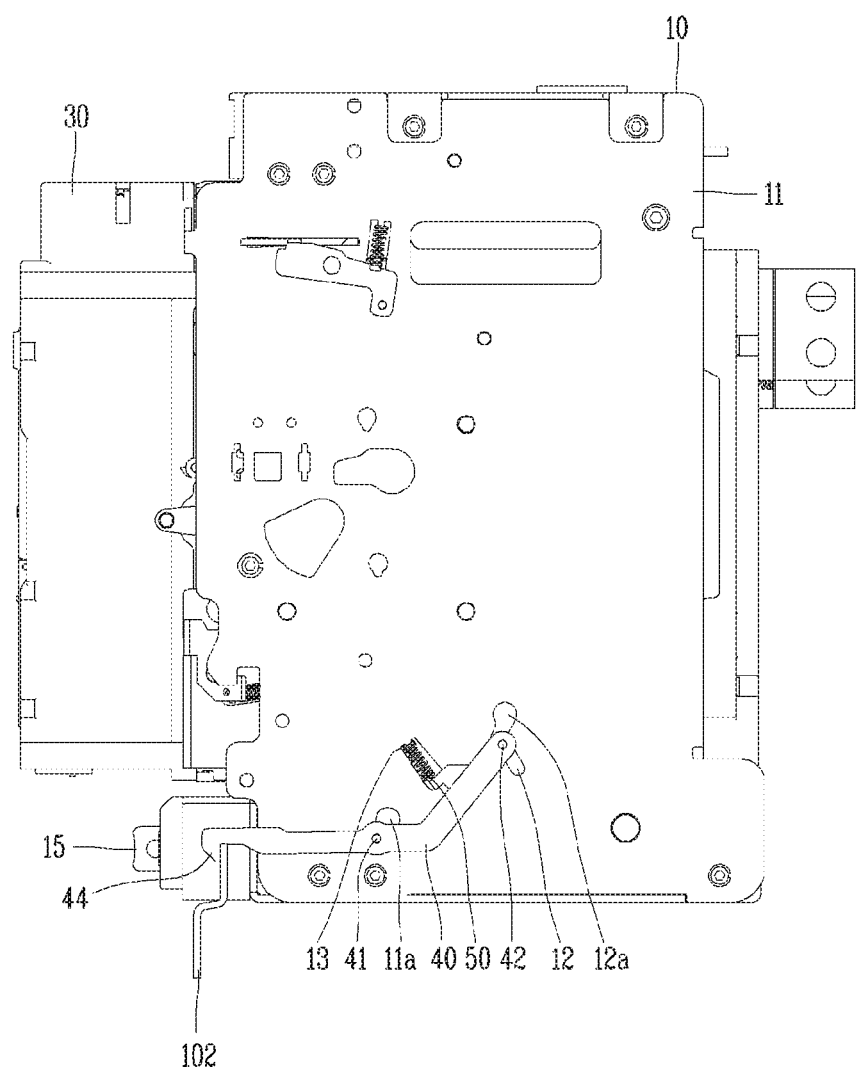
FIG. 13 is a side view of a door locking device of a distribution board of an air circuit breaker according to another embodiment of the present disclosure.

A door locking device of a distribution board of an air circuit breaker according to another embodiment of the present disclosure will be described with reference to FIG. 13.

This embodiment is the same as the previous embodiment, except that the elastic member 50 is installed in a different position. The spring hole 13a is provided at one end of the hook plate 40. The elastic member 50 may be provided as a tensile spring. The elastic member 50 may be installed such that both end portions are inserted into a hole formed at an upper end of the spring hole 13a and a hole formed at a portion protruding from one end of the hook plate 40. The elastic member 50 provides elastic force to the hook plate 40 to operate in a counterclockwise direction.

As described above, in the door locking device of a distribution board of an air circuit breaker according to the embodiments of the present disclosure, since an operation of the constraint plate of the distribution board door is restrained or allowed by the hook plate interworking with the link mechanism of the cradle, opening of the distribution board door may be restrained or allowed through a simple configuration. Thus, an additional operation process or production cost may be reduced.

The foregoing embodiments and advantages are merely exemplary and are not to be considered as limiting the present disclosure. The present teachings can be readily applied to other types of apparatuses. This description is intended to be illustrative, and not to limit the scope of the claims. The features, structures, methods, and other characteristics of the exemplary embodiments described herein may be combined in various ways to obtain additional and/or alternative exemplary embodiments.

What is claimed is:

1. A door locking device of a distribution board of an air circuit breaker, including a transmission shaft installed within a cradle and transmitting power for drawing in and out a circuit breaker body; a shaft link rotatably coupled to one end of the transmission shaft; a link rod having one end rotatably coupled to a portion of the shaft link; a cam plate rotatably coupled to the other end of the link rod and pushing or pulling the circuit breaker body; and a constraint plate installed in a distribution board door, the door locking device comprising:
   a pressing part protruding from a portion of the link rod; and
   a hook plate rotatably coupled to a side of the cradle and having one end in contact with the pressing part to receive a rotational force and the other end restricting or releasing the constraint plate,
   wherein the hook plate releases the constraint plate in a disconnection position.

2. The door locking device of claim 1, wherein an elastic member providing the rotational force based on elasticity to the hook plate is installed in a portion of the cradle, and the elastic member is configured as a compressive spring or a tensile spring.

3. The door locking device of claim 2, wherein a spring hole allowing the elastic member to be insertedly installed therein is provided in the cradle.

4. The door locking device of claim 1, wherein coupling holes allowing the cam plate and the shaft link to be coupled thereto, respectively, are formed in an upper end and a lower end of the link rod.

5. The door locking device of claim 1, wherein a lower surface of the pressing part is perpendicular to a length direction of the link rod.

6. The door locking device of claim 1, wherein a pressing part shaft is provided at one end of the hook plate and comes into contact with the pressing part.

7. The door locking device of claim 6, wherein an operation recess allowing the pressing part shaft to slidably come into contact therewith and having a predetermined length is provided below the pressing part.

8. The door locking device of claim 1, wherein an arrest part arrested by the constraint plate protrudes from the other end of the hook plate.

9. The door locking device of claim 6, wherein a rotational shaft protrudes from a central portion of the hook plate, and a rotational shaft hole allowing the rotational shaft to be insertedly installed therein is provided on a side of the cradle.

10. The door locking device of claim 9, wherein a pressing part shaft slit allowing the pressing part shaft to be slidably inserted and installed therein is provided on a side of the cradle.

11. The door locking device of claim 10, wherein the pressing part shaft slit corresponds to a portion of a circumferential surface centered on the rotational shaft hole.

12. The door locking device of claim 9, wherein the pressing part shaft and the rotational shaft are configured to have a three-stage structure including a first step axial part, a second step axial part, and a third step axial part positioned sequentially from the hook plate, and the third step axial part has a diameter smaller than that of the first step axial part and the second step axial part has a diameter smaller than that of the third step axial part.

13. The door locking device of claim 12, wherein assembly holes having a diameter larger than the third step axial part and smaller than the first step axial part is provided respectively on one sides of the rotational shaft hole and the pressing part shaft slit in a communicating manner.

* * * * *